(12) United States Patent
Georget

(10) Patent No.: US 7,017,717 B2
(45) Date of Patent: Mar. 28, 2006

(54) TWINE BRAKE FOR LARGE ROUND BALER

(75) Inventor: Claude Georget, Chargey les Gray (FR)

(73) Assignee: Deere & Company, Moline, IL (US)

( * ) Notice: Subject to any disclaimer, the term of this patent is extended or adjusted under 35 U.S.C. 154(b) by 464 days.

(21) Appl. No.: 10/156,328

(22) Filed: May 24, 2002

(65) Prior Publication Data

US 2002/0175031 A1    Nov. 28, 2002

(30) Foreign Application Priority Data

May 25, 2001    (DE) ................................ 101 25 569

(51) Int. Cl.
    *B65H 59/16*    (2006.01)
(52) U.S. Cl. ........................ 188/65.1; 100/5; 56/450; 56/341
(58) Field of Classification Search ................. 188/74, 188/75, 196 R, 196 M, 196 V, 206 R, 382, 188/65.1; 267/89, 278, 69, 177; 100/5, 100/8, 13, 32, 34, 77, 87–89; 56/450, 341, 56/343, DIG. 2; 53/581, 587
See application file for complete search history.

(56) References Cited

U.S. PATENT DOCUMENTS

| | | | | |
|---|---|---|---|---|
| 4,155,296 A | * | 5/1979 | Schafer | 100/3 |
| 4,378,732 A | * | 4/1983 | Simonis et al. | 100/5 |
| 4,446,783 A | | 5/1984 | Illy | 100/5 |
| 4,455,930 A | * | 6/1984 | Crawford | 100/3 |
| 4,557,189 A | * | 12/1985 | Schaible | 100/4 |
| 4,605,186 A | * | 8/1986 | Fernz | 244/110 B |
| 4,627,340 A | * | 12/1986 | Glass et al. | 100/5 |
| 4,715,175 A | * | 12/1987 | Schaible et al. | 56/432 |
| 5,231,828 A | * | 8/1993 | Swearingen et al. | 56/341 |
| 5,551,218 A | * | 9/1996 | Henderson et al. | 53/504 |
| 5,870,950 A | * | 2/1999 | Wiedel | 100/33 R |
| 5,894,790 A | * | 4/1999 | Viaud | 100/5 |
| 6,016,646 A | * | 1/2000 | Taylor et al. | 56/341 |
| 6,209,450 B1 | * | 4/2001 | Naaktgeboren et al. | 100/4 |

FOREIGN PATENT DOCUMENTS

| | | |
|---|---|---|
| DE | 25 25 491 A1 | 12/1976 |
| DE | 38 22 553 A1 | 1/1990 |
| DE | 299 05 765 U1 | 7/1999 |
| EP | 0 819 376 | 1/1998 |
| EP | 0 981 947 | 3/2000 |
| EP | 1 179 295 | 2/2002 |
| FR | 2 518 363 | 5/1983 |

* cited by examiner

Primary Examiner—Devon C. Kramer

(57) ABSTRACT

A large round baler is provided with a twine wrapping arrangement including a twine dispensing arm, a twine separating or severing device located between the dispensing arm and a baling chamber and a twine brake located between the separating device and the baling chamber. The twine brake is constructed of spring elements that are yieldably biased together, preferably in the form of a coil tension spring having a guide finger for guiding twine into a nip formed between the finger and a first coil of the spring, this nip receiving a length of twine extending between the dispensing arm and a bale being wrapped with the twine, with the twine becoming wedged between adjacent coils of the spring. As an alternative construction, a stack of Belleville springs are held together by bolt and nut assembly, with the nip being defined between adjacent springs.

7 Claims, 2 Drawing Sheets

TWINE BRAKE FOR LARGE ROUND BALER

FIELD OF THE INVENTION

The invention concerns a large round baler with a baling chamber, a binding arm, a separating arrangement and a twine brake.

BACKGROUND OF THE INVENTION

U.S. Pat. No. 4,627,340 discloses a large round baler with a binding arm, a twine brake, a separating arrangement and a twine retainer. The twine brake is located in the outlet region of the binding arm and applies a certain resistance during the running of the twine, that results in a certain tension in the twine and thereby a certain retaining force. The retaining force is the result of the fact that the last strands of the twine are retained between underlying strands or in the baled crop as a result of friction. Furthermore the twine brake prevents the twine from retracting into the binding arm after the separating process. The separating arrangement is located between the cylindrical bale and the twine retainer. The twine retainer is located at the frame of the large round baler to the interior and spaced from its side wall, particularly between the binding arm and the separating arrangement. The piece of twine associated with the binding arm is held by the twine retainer after the separating process so that the twine can be drawn out of the binding arm at the beginning of the binding process on the basis of the movement of the binding arm.

The problem underlying the invention is seen in the fact that the known twine brake can generate only a limited tension since otherwise the twine is drawn out of the twine retainer upon the movement of the binding arm or is not carried along after being grasped by the crop.

SUMMARY OF THE INVENTION

According to the present invention, there is provided an improved twine feeding arrangement for a large round baler, which features a twine brake.

An object of the invention is to provide a twine feeding arrangement wherein a twine brake is positioned between the twine separating or cut-off mechanism and the baling chamber.

In this way the end region of the twine that had been cut off from the cylindrical bale is drawn out of the twine brake by it, while the region associated with the twine roll hangs out of the binding arm without tension and is ready for the next binding process. Since the tension remains in the part already cut off but not in the portion that remains in the binding arm, the portion remaining in the binding arm does not retract but hangs out of the binding arm without being shortened. The tension in the twine can be increased by a factor of four and even more compared to twine brakes known previously.

A more specific object is to provide a twine brake in the form of a spring that has helical coils or several springs, for example, Belleville springs pressed upon each other or leaf springs. This makes possible an operation wherein, when the twine is drawn through the twine brake, it retains the twine tension and, depending on the position of the twine, the tension is increased if the twine is additionally drawn into the spring coils or between the spring elements.

A simple and cost effective configuration is offered by a helical extension spring between whose coils or windings the twine can be drawn as long as rounded edges do not damage the twine. The introduction of the twine between individual spring coils or spring elements is always performed reliably if a catcher end, for example, a projecting section of windings at the beginning, a finger or the like is provided. While it would be possible to configure the spring as a one-piece component with an adjoining part or to weld this or these into place or otherwise to fasten permanently; in particular for a retrofit, however, it is advantageous if the spring(s) are provided with a retaining end through which, for example, a screw can be inserted so that even the spring tension is not reduced.

Since on occasion the spacing between the end face of the cylindrical bale and the last layer of the twine must be made to conform to the type of crop to be baled or the further processing of the cylindrical bale, the spacial arrangement of the twine brake and a spacing retainer used can be maintained by connecting these to each other, that is, arranging them upon each other.

Since the crop to be baled varies in stiffness, a sufficient insertion of the twine into the surface of the bale can in each case be assured by having the retaining or braking force of the twine brake adjustable.

A twine brake according to the invention can be configured at a particularly favorable cost if a tine of a pick-up or a reel is used for this purpose or if it is formed thereby. Tines of this type are offered in large quantities as semi-finished parts.

DESCRIPTION OF THE PREFERRED EMBODIMENT

Figure 1:
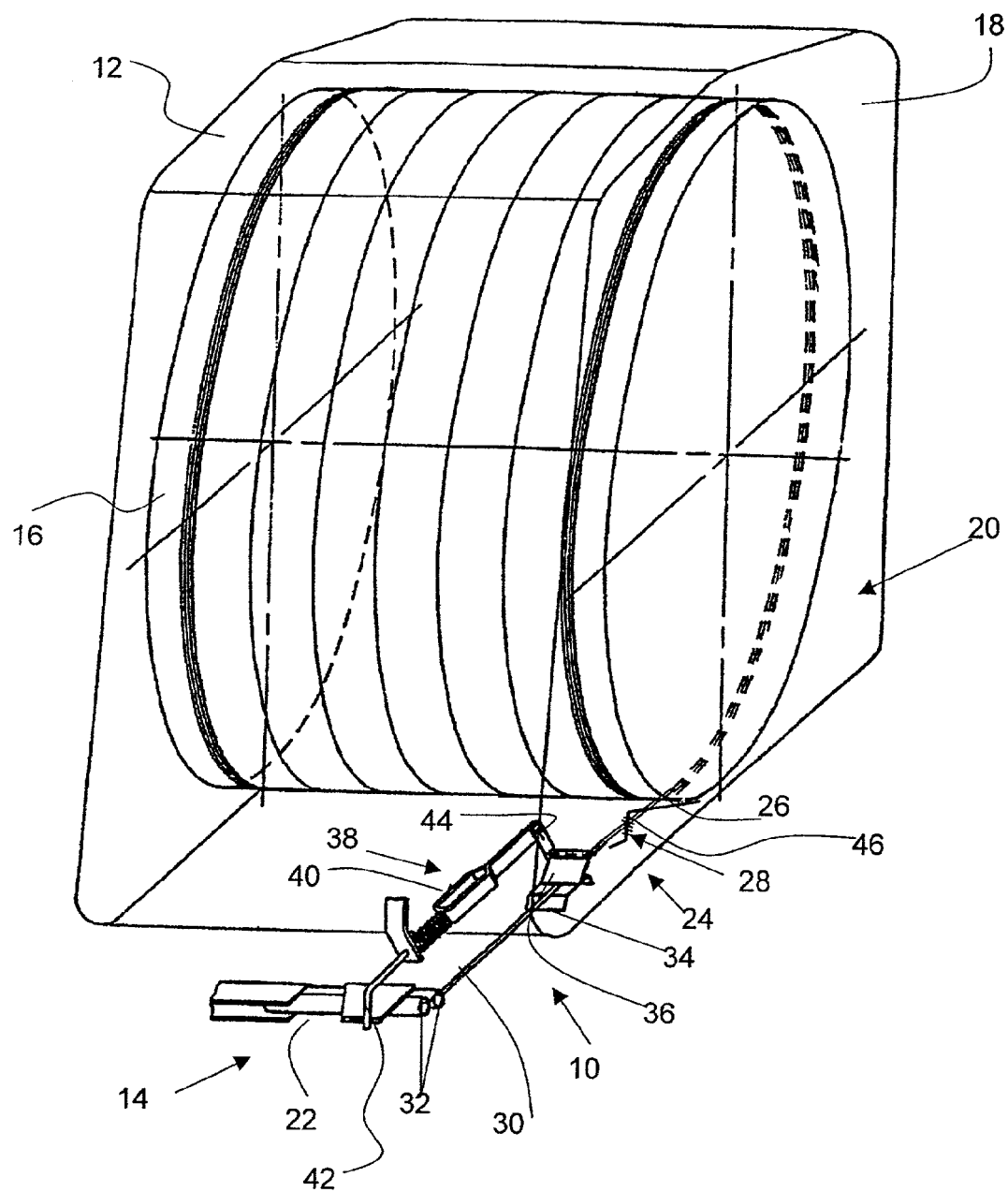
FIG. 1 is a schematic, left front perspective view of the baling chamber and binding arrangement of a large round baler.

Referring now to FIG. 1, there is shown a portion of a large round baler 10 in which a housing 12 and a binding arrangement 14 can be recognized. The large round baler 10 may be of any known type, that is, with a fixed or a variable baling chamber, with a pre-chamber or the like. Such large round balers are offered, for example, by JOHN DEERE and therefore do not require any detailed explanation. It should merely be noted that the large round baler 10 is supported on wheels, moved along the ground and during operation takes up crop from the ground in order to shape it into a cylindrical bale 16.

Among other items, the housing 12 includes side walls 18 between which a baling chamber 20 is formed for the forming of a cylindrical bale 16. Further details such as the baling means, outlet gate, etc. do not require an explanation here.

The binding arrangement 14 contains a binding arm 22, a separating arrangement 24, a spacing retainer 26 and a twine brake 28.

The binding arrangement 14 is used to wrap twine 30 in a helical pattern on the circumference of the rotating cylindrical bale 16 at the end of the process of forming the bale, and to wrap several strands of twine upon themselves near its end face that are drawn into the crop and wedge themselves into the previously laid strands, whereby they are retained on the circumferential surface. The higher the tension force here exerted on the twine 30, the stronger the strands are retained on the cylindrical bale 16. Finally the twine 30 is separated from the twine supply, by operation of the separating arrangement 24, and the finished and wrapped cylindrical bale 16 is rolled out of the large round baler 10. In place of a single binding arrangement 14, as shown, two binding arrangements 14 could be provided, in particular, in the region of each side wall 18.

The binding arm 22 can be pivoted about a vertical axis, not shown, in a generally horizontal plane, in such a way that in a region of the side walls 18 it assumes the greatest spacing from the cylindrical bale 16, while in the central region of the cylindrical bale 16 it comes closest to the bale. In this embodiment the binding arm 22 is equipped with two outlets 32 from which the twine 30 can reach the cylindrical bale 16; in a corresponding manner, two strands of twine 30 are also provided each of which is wrapped about the circumferential surface of the cylindrical bale 16. More or fewer strands of twine 30 and/or outlets 32 may also be provided. The twine 30 reaches the binding arm 22 from a supply roll, not shown, but known in itself, but is previously braked slightly, so that the twine 30 is not caught in the hollow binding arm 22. At the end of the binding process the outlets 32 are located relatively close to the particular side wall 18 and could therefore guide the twine 30 to the outer edge of the cylindrical bale 16. The binding arm 22 can also be pivoted in a vertical plane or a generally vertical plane.

The separating arrangement 24 is also configured in conventional manner and contains an anvil 34, a knife 36 and an actuating arrangement 38. The anvil 34 is configured as a rigid steel plate that is fastened to the side wall 18 and is located at the end of the binding process in the region of movement of the twine 30. The knife 36 is attached to the side wall 18 in a manner not shown but known in itself so as to pivot vertically and, except in its cutting condition, maintain a spacing to the anvil 34, through which the twine 30 can extend. The knife 36 is generally configured as wide as the anvil 34.

The actuating arrangement 38 for the separating arrangement contains a spring loaded tension rod 40 with a stop 42 and a lever arm 44. The actuating arrangement 38 is used to press the knife 36 against the anvil 34 and thereby to separate the twine 30, as soon as the binding arm 22 approaches its end position. Accordingly the stop 42 is located in the region of movement of the free end of the binding arm 22 and is loaded by the latter, when this reaches the end of its movement. Thereupon, the stop 42 configured as a hook pulls on the tension rod 40, which is connected with the lever arm 44 so as to pivot. The lever arm 44 is connected rigidly with the knife 36 and presses this against the anvil 34 when the tension rod 40 was moved in the corresponding direction. While the knife 36 presses the twine 30 against the anvil 34, an increased tension develops for a brief period in the twine 30, that has the effect that the twine 30 is drawn into the surface of the cylindrical bale 16 and becomes wedged into the remaining strands of the twine 30.

In this embodiment the spacing retainer 26 is configured as a steel rod bent in two places in opposite directions and is provided with a guide section 46 between the bends. The spacing retainer 26 is used to adjust the spacing of the last strands of the twine 30 from the end of the cylindrical bale 16 in order to avoid that the twine 30 slides off the edge of the cylindrical bale 16 and becomes loose. While the spacing retainer 26 may be attached rigidly, it may also be fastened so that is can be adjusted relative to the side wall 18, as this was disclosed, for example, in EP-0 981 947.

The description so far refers to the configuration of a large round baler 10 and a binding arrangement 14 as are known in the state of the art.

Figure 2:
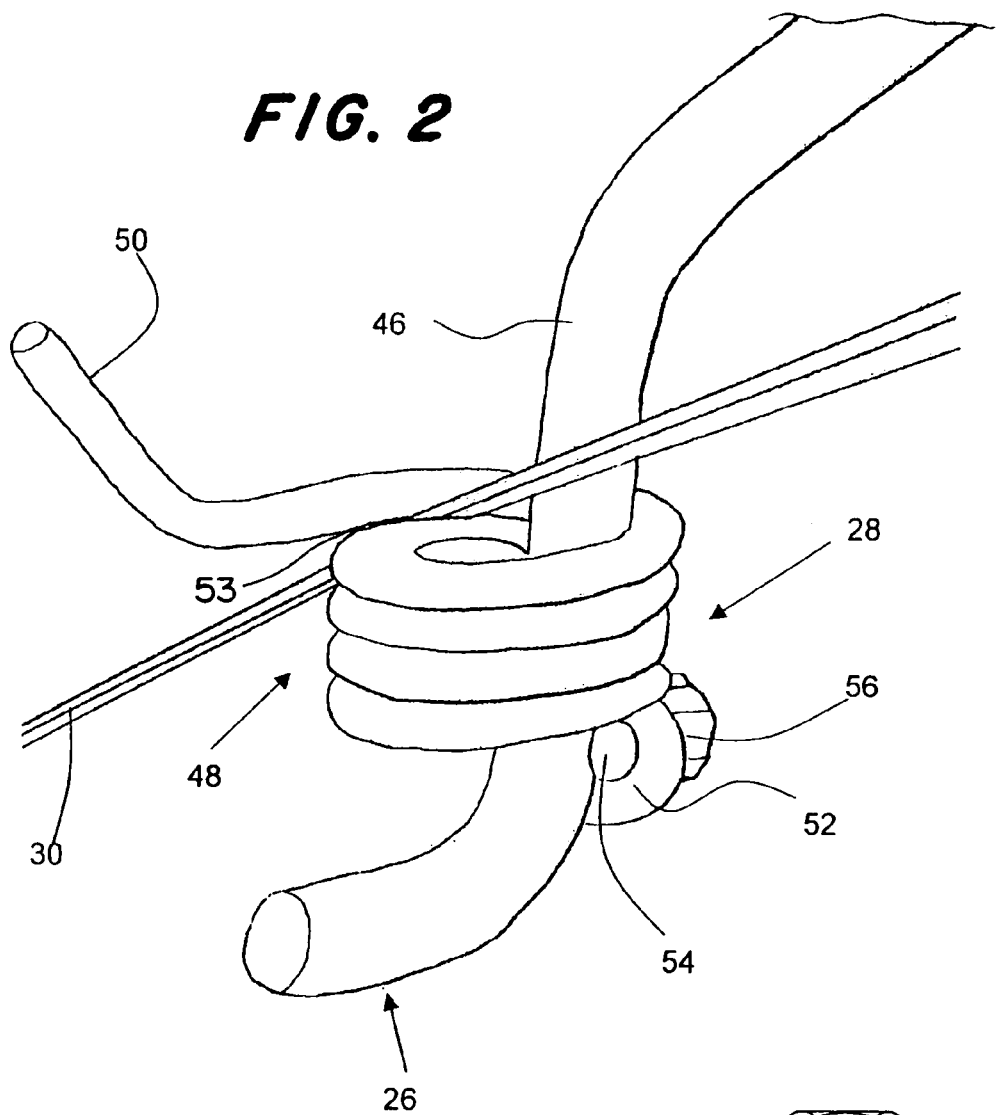
FIG. 2 shows an enlarged view of the twine brake constructed in its preferred form as a coil tension spring.

The twine brake 28 is shown with the affected area of the spacing retainer 26 in the enlarged view of FIG. 2. According to this, the twine brake 28 is configured as the tine of a pick-up or of a reel in spring steel and contains spring elements 48, a catcher end or guide finger 50 and a retainer end 52. Other configurations, particularly those of other materials such as plastic, composite materials and the like are equally possible. The attachment of the twine brake 28 on a spacing retainer 26 is not required, but only advantageous; rather the twine brake 28 can also be attached to the side wall 18 or the housing 12 itself at an appropriate location.

The spring elements 48 are configured as four joined helical-shaped coils or windings that leave an interior space that is penetrated by the guide section 46 of the spacing retainer 26 in the axial direction.

The catcher end 50 represents the beginning of the spring elements 48 on the one hand and extends initially in the axial direction and then bent from the tangent away from the spring elements 48 so that its end projects a considerable distance radially beyond the spring elements 48. At the location whrere the upeer helical coil of the spring elements 48 departs to form the catcher end 50, a nip or gore area 53 is defined for receiving strands of twine 30, in a manner described below.

The retainer end 52 represents the opposite end region of the spring elements 48 and is configured in this embodiment as an eye as is known from tines on pick-ups and reels. The retainer end 52 is secured by means of a peg 54 on the spacing retainer 26, whose guide section 46 is fastened, for example, welded. The peg 54 is configured as the shaft of a screw onto which a nut 56 can be applied in order to press the retainer end 52 against the guide section 46.

The orientation of the twine brake 28 and, in particular, the catcher end 50 is selected in such a way that, during the movement of the binding arm 22 to the end face of the cylindrical bale 16 or to the side wall 18, the twine 30 is guided into the nip or gore area 53 between the catcher end 50 and the spring elements 48 located towards the former. The closer the outlets 32 approach the side wall 18, the deeper the twine 30 reaches between the spring elements 48 whereby the friction between the twine 30 and the spring elements 48 increases and therewith the tension in the twine 30. This increased tension leads to the twine 30 being drawn particularly deep into the surface of the cylindrical bale 16 and between the strands of twine previously deposited and is retained there particularly well. As soon as the binding arm 22 reaches its end position and actuates the knife 36, the twine 30 is separated. After the separation process, the high tension in the twine end that has been cut is maintained until this end has been drawn out of the twine brake 28 as a result of the further movement of the cylindrical bale 16. The particular effect of the invention consists in the fact that the tension in the twine 30 exists between the knife 36 and the cylindrical bale 16 and not in the region between the binding arm 22 and the knife 36.

Figure 3:
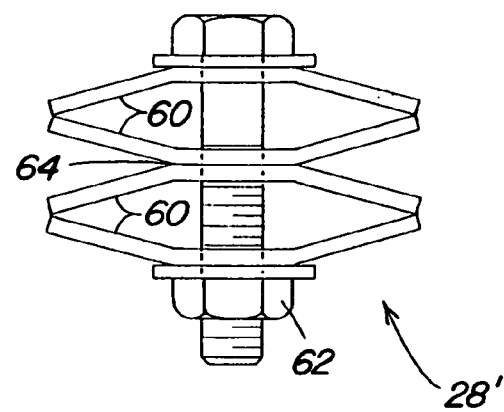
FIG. 3 shows an alternate embodiment of a twine brake constructed of a stack of Belleville springs.

Referring now to FIG. 3, there is shown an alternate embodiment of the twine brake. Specifically, there is shown a twine brake 28' in the form of four Belleville springs 60 stacked in series and held together by a bolt and nut assembly 62. The adjacent springs 60 at the middle of the stack define a nip 64 for receiving a length of the twine 30 during the wrapping process. The tension afforded by the brake 28' can be adjusted by loosening or tightening the nut of the bolt and nut assembly 62. It is also to be noted that in lieu of the bolt, a rod member could be used which is formed to perform the respective functions performed by the spacing retainer 26 and guide finger 50 of the embodiment illustrated in FIG. 2, while still performing as the adjustable bolt and nut assembly 62.

Having described the preferred and one alternate embodiment, it will become apparent that various modifications can be made without departing from the scope of the invention as defined in the accompanying claims.

What is claimed is:

1. In a large round baler including a baling chamber, a binding arm having a dispensing end adapted for moving transversely across said baling chamber between endpoints during a wrapping operation, a separating arrangement mounted between one of said endpoints and said baling chamber for selectively severing a length of twine extending along a predetermined path between said dispensing end of said binding arm and a bale formed in said baling chamber, and a twine brake, the improvement comprising: said twine brake being located along said predetermined path and between said separating arrangement and the baling chamber.

2. The large round baler, as defined in claim 1, wherein said twine brake includes at least two adjacent spring elements yieldably biased together in engagement with each other so as to define at least one nip located in said predetermined path for receiving said length of twine.

3. The large round baler, as defined in claim 1, wherein said twine brake is configured as a helical extension spring having adjacent coils defining a nip between them located in said predetermined path for receiving said length of twine.

4. The large round baler, as defined in claim 3, wherein said twine brake includes a catcher end extending forwardly and transversely from said nip.

5. The large round baler, as defined in claim 4, wherein said nip is located at a first end of said helical extension spring, and an eye being formed at a second end of said helical extension spring.

6. The large round baler, as defined in claim 2, wherein said twine brake includes an adjustable structure for effecting an adjustment of a force yieldably biasing said at least two adjacent spring elements together.

7. The large round baler, as defined in claim 6, wherein said at least two adjacent spring elements are in the form of Belleville washers; and said adjustable structure includes a bolt and nut arrangement.

* * * * *